United States Patent [19]

Barigot et al.

[11] 4,223,269
[45] Sep. 16, 1980

[54] DEVICE FOR INSERTING SEVERAL BITS IN A RHYTHMED DIGITAL TRAIN

[75] Inventors: Jean-Claude Barigot, Brie Comte Robert; Jean-Jacques Beau, Antony, both of France

[73] Assignee: Compagnie Industrielle des Tele-communications Cit-Alcatel S.A., Paris, France

[21] Appl. No.: 829,982

[22] Filed: Sep. 1, 1977

Related U.S. Application Data

[63] Continuation of Ser. No. 662,204, Feb. 27, 1976, abandoned.

[30] Foreign Application Priority Data

Mar. 4, 1975 [FR] France .................. 75 06697

[51] Int. Cl.$^2$ .................. G06F 7/00; G11C 19/00; H03K 5/18
[52] U.S. Cl. .................. 328/63; 328/37; 328/43; 328/109; 364/900
[58] Field of Search .................. 364/900 MS File; 307/232, 221 R, 223 R; 328/37, 109, 110, 157, 43, 63

[56] References Cited

U.S. PATENT DOCUMENTS

| | | | |
|---|---|---|---|
| 2,911,544 | 11/1959 | Ostendorf, Jr. | 328/37 X |
| 2,923,839 | 2/1960 | Meyers | 307/221 R |
| 2,951,230 | 8/1960 | Cadden | 328/37 X |
| 3,083,903 | 4/1963 | Larson | 364/900 |
| 3,201,759 | 8/1965 | Kelly | 364/900 |
| 3,399,386 | 8/1968 | Walker | 364/900 |
| 3,430,211 | 2/1969 | Foure et al. | 364/900 |
| 3,577,084 | 5/1971 | Atcherson et al. | 328/37 X |
| 3,949,384 | 4/1976 | Lohmann | 328/37 X |

*Primary Examiner*—Larry N. Anagnos
*Attorney, Agent, or Firm*—Haseltine, Lake & Waters

[57] ABSTRACT

Device for inserting several bits in a rhythmed digital train, comprising a closed looped shift register, the shift being controlled according to the rhythm of the train. The register receives, in parallel, the bits to be inserted, the write-in locations depending on the instant at which it is required to have these bits available in order to insert them in the train. Preferably, the train being subdivided into sub-groups (IT) of adjacent bits, the register comprises as many bistable elements as there are bits in a sub-group.

7 Claims, 2 Drawing Figures

DEVICE FOR INSERTING SEVERAL BITS IN A RHYTHMED DIGITAL TRAIN

This is a continuation of application Ser. No. 662,204 filed Feb. 27, 1976 now abandoned.

This invention relates to the technique of digital data transmission and concerns, more particularly, a device for inserting several bits at definite instants in a rhythmed digital train.

In general, a transmitted digital train is constituted by logic signals, having different origins (speech channels, data channels, signalling channels, frame locking channel, etc.). These signals having different origins are formed at distinct locations of the tranmission equipment, then synchronized and multiplexed before line transmission.

To effect the sequencing in time of the signals constituting the digital train, the method currently used consists in forming, in the different sub-assemblies which are concerned, an auxiliary time base depending on the pilot time base of the assembly. This leads compulsorily to a redundancy of certain logic functions (binary counters and decoders, more particularly).

The aim of the present invention is to avoid the forming of auxiliary time bases and to provide only a single synchronisation signal, whatever the data insertion instants in the digital train may be. Such a device is particularly economical when it is required to insert a small number of binary elements in a frame. The word "frame" is used hereinafter to mean a set of adjacent bits in a train, that set comprising, for example, 256 bits or 32 sub-groups of 8 bits each. Such a distribution is, for example, used for telephonic transmission according to the pulse coded modulation technique, in which each sub-group constitutes the coding of an analog sample.

In other words, the object of the invention is a rhythmed device, which receives several bits and which sends them towards an output, one by one, at well-defined instants.

According to the invention, this device is characterized in that it comprises a closed loop shift register receiving a regular shift rhythm, with one output and several input terminals, which are displaced in relation to the output in such a way that the bits of a group which are applied simultaneously at the said input terminals be available at the output of the register at the precise instant of their use.

In a prefered embodiment of the invention, the number of bistable elements of the shift register is a sub-multiple of the number of bits contained in a frame, constituting a group of adjacent bits in the said train, and there is a circuit for controlling the output of the register which enables transfer only during a period equal to a sub-multiple of the duration of the frame.

The invention is based on the previous knowledge of the number of clock periods separating the instant of write-in of data in a memory from the instant when if is taken into consideration for insertion in the digital frame. The positioning of the data memory is chosen as a function of the difference between those two instants, this making that data available at the output at the instant of its use. The closed loop shift register enables a permanent memorizing of the data, whatever the above defined difference may be.

The invention will be described hereinbelow in greater detail by means of a preferred embodiment, to which the two figures refer.

Figure 1:
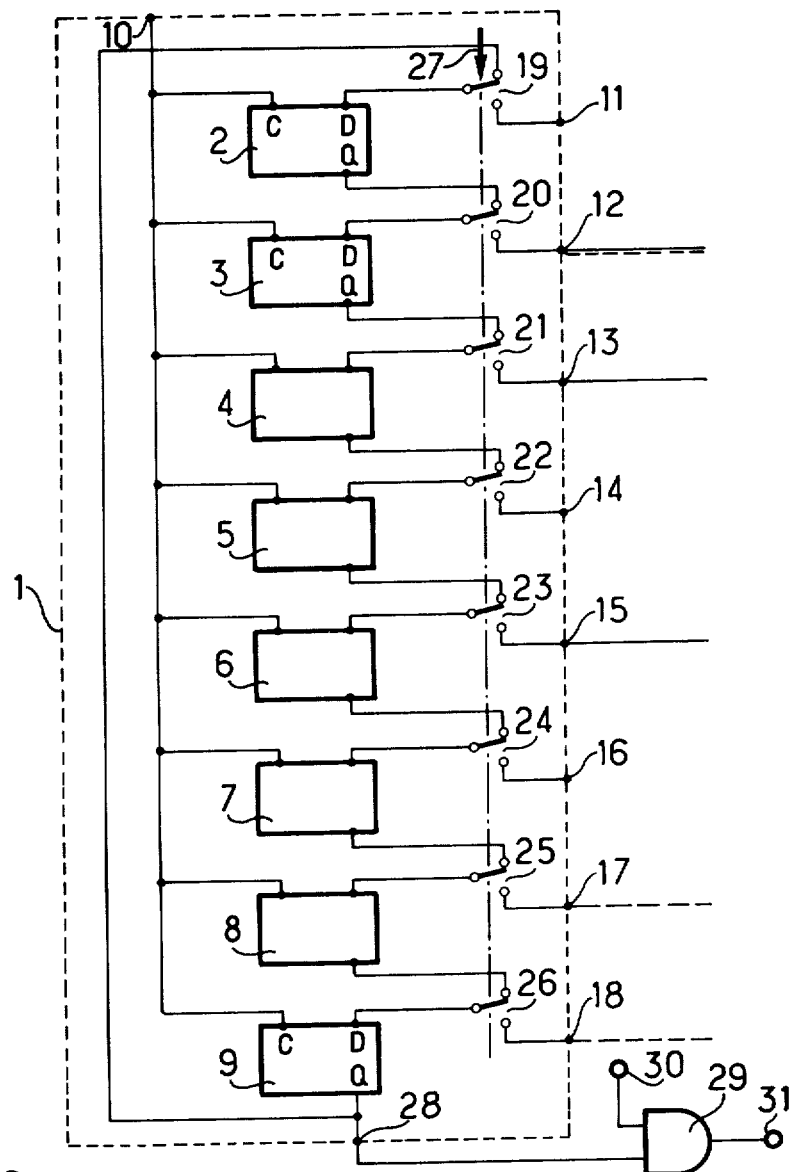
FIG. 1 shows diagrammatically a device according to the invention.

FIG. 1 shows a closed loop shift register 1, which comprises eight bistable elements 2 to 9, a clock input 10 for the shift rhythm and eight parallel write-in inputs 11 to 18. Each of those inputs is connected, through an electronic switch 19 to 26, with an input D of one the bistable elements. That switch alternately connects the respective input 11 to 18 or the output Q of the preceding bistable elements to the said input D. It is controlled by a write-in synchronization signal, which is applied to an input 27.

A single output 28 of the register 1 is connected to the output Q of one of the bistable flip-flops, for example, the bistable flip-flop 9. That output 28 is connected to a control circuit 29, constituted by an AND gate, which receives, on another input 30, a gating pulse. The latter makes the circuit 29 conductive for the bits leaving the register during a period of time corresponding to eight bits of the frame. On one output 31 of the circuit 29, the bits written in the register are available at the required instants to be inserted in a frame.

The operation of that device is described hereinafter with reference to FIG. 2. Let it be assumed that three bits are to be inserted in a period of time IT(N) corresponding to a certain sub-group of eight bits of the frame. The first of those bits is to be inserted in the fifth place, the second is to be inserted in the seventh place and the third is to be inserted in the eight place of that sub-group. A regular shift rhythm of the train, is applied to the input 10, and a write-in pulse is applied to the input 27 and coincides, for example, with the appearing of the first bit of the sub-group of eight bits in question.

The three bits to be inserted are available throughout the whole duration of the frame and they are applied respectively to the input 15 of the bistable element 6, to the input 13 of the bistable element 4 and to the input 12 of the bistable element 3. When a write-in pulse reaches the input 27, all the switches 19 to 26 connect the inputs 11 to 18 to the inputs of the respective bistable elements. At the end of that bit time, the three bits to be inserted are written in the corresponding bistable elements and the switch returns to its rest position, thus closing the shift loop. The pulses of the clock then shift all the contents of the register at the rhythm of the train and simultaneously, the control circuit 29 is made conductive by the gating pulse.

Figure 2:
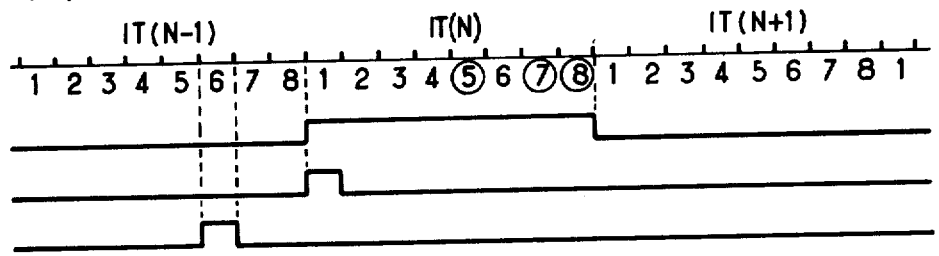
FIG. 2 shows diagrams, concerning the operation of that device.

The pulses of the pilot clock and their significance inside a frame composed of sub-group IT of eight bits each will be seen at the top of FIG. 2. The second diagram of that figure shows the gating pulse which is applied to the input 30 and which effects the selecting of the IT(N) in which the three bits are to be written. The third diagram shows the write-in pulse which is applied to the input 27. It is apparent that the bit which has been written in the bistable element 6 is available three clock pulses later at the output 31. The bit which was originally written in the bistable element 4 is present at the output 31 two pulses later and at the following pulse, the bit originally written in the bistable element 3, is availabe on the output 31.

The invention is not limited to that example of embodiment. A first modification within the scope of the invention consists in using a write-in instant which does not coincide with the first bit of the sub-group of eight bits IT(N). The fourth diagram in FIG. 2 shows that case, where the write-in is effected three pulses earlier than in the preceding case. To be able to have the bits available at the output of the right time, the location of write-in in the register must be modified, using, as shown in discontinuous lines in FIG. 1, the inputs 12, 18 and 17 instead of 15, 13 and 12. It is even possible to advance further the write-in instant, thus making the bits circulate in the register several times before they are transferred to the output.

It is also possible to delete the control circuit 29 in the case where the frame is not too long. In that case, the register comprises as many bistable elements as there are bits in a frame. Lastly, it is easily possible to combine two or several devices according to FIG. 1, when it is required to write a few bits in different locations in two or several sub-groups IT, which are relatively distant from each other in a frame.

We claim:

1. A device in a synchronized data processing system for inserting groups of bits at predetermined instants of time into a synchronized and framed data train, the system including a binary data train channel comprising at least one data frame, and including clock pulses and an input to the channel, said device comprising: a closed loop shift register with a plurality of parallel write-in inputs receiving said groups; a shift input receiving said clock pulses and a serial output delivering bits to the input of said data train channel, the parallel write-in operation being dependent on said predetermined instants of time.

2. The device as defined in claim 1, wherein said input (10) of the shift register (1) receiving shift pulses from a shift clock forming part of the data processing system and producing pulses of the data train.

3. The device as defined in claim 1, including a number of bistable elements (2 to 9) equal to a submultiple of the number of pulses in the frame.

4. The device as defined in claim 3 further comprising a control circuit (29) having a gating input (30), a data input (28) and an output (31), comprising the output of the device, the pulse applied to said gating input activating said control circuit for a time period equal to a submultiple of the data frame, said data input being connected to one of said bistable elements (2 to 9) enabling the use of the pulses stored in said shift register only during a time period equal to said submultiple of the duration of the data frame.

5. The inserting device as defined in claim 4, further comprising an electronic switch (19 to 26) having a synchronization signal input (27) for validating input terminals (11 to 18), and two operative positions, one in which said bistable elements (2 to 9) are serially connected for circulating the stored pulses therein, another of said input terminals (11 to 18) being individually connected to respective ones of said bistable elements.

6. A device as defined in claim 1 wherein said parallel inputs comprise inputs to individual bistable circuits of said shift register, said bistable circuits being connected in cascade so that contents of one bistable circuit is transferred to the next following bistable circuit when a clock pulse is applied to a shift input, said clock pulses being applied to the shift input for producing the shift operation, changing of the shift register over said parallel inputs being effected at an instant not coinciding with a clock pulse, and means connecting said serial output of said register to said serial input of said data train channel.

7. A device as defined in claim 1, wherein said input of the shift register (1) receives shift pulses from a shift clock forming part of the data processing system and producing pulses of the data train, a plurality of bistable elements (2 to 9) equal to a submultiple of the number of pulses in the frame, a control circuit (29) having a gating input (30), a data input (28) and an output (31), comprising the output of the device, the pulse applied to said gating input activating said control circuit for a time period equal to a submultiple of the data frame, said date input being connected to one of said bistable elements (2 to 9) enabling the use of the pulses stored in said shift register only during a time period equal to said submultiple of the duration of the data frame, an electronic switch (19 to 26) having a synchronization signal input (27) for validating input terminals (11 to 18), and two operative positions, one in which said bistable elements (2 to 9) are serially connected for circulating the stored pulses therein, another of said input terminals (11 to 18) being individually connected to respective ones of said bistable elements.

* * * * *